United States Patent [19]
Stewart et al.

[11] Patent Number: 5,480,501
[45] Date of Patent: Jan. 2, 1996

[54] ULTRASONIC APPARATUS AND METHOD FOR PLACING INDIVIDUAL CHIPS OF LIGHT LOCK MATERIAL

[75] Inventors: Wallace S. Stewart, Penfield; Gary E. Merz, Rochester; Dale C. Marshall, Hamlin, all of N.Y.

[73] Assignee: Eastman Kodak Company, Rochester, N.Y.

[21] Appl. No.: 223,043

[22] Filed: Apr. 5, 1994

Related U.S. Application Data

[63] Continuation of Ser. No. 6,298, Jan. 19, 1993, abandoned.
[51] Int. Cl.⁶ .......................... B32B 31/02; B32B 31/04; G03B 17/26
[52] U.S. Cl. .......................... 156/73.1; 156/69; 156/293; 156/308.2; 156/308.4; 156/556; 156/569; 156/580.1; 156/580.2; 354/275; 354/277
[58] Field of Search .................. 354/275, 277; 156/73.1, 69, 293, 556, 569, 580.1, 580.2

[56] References Cited

U.S. PATENT DOCUMENTS 3,537,376  11/1967  Fleming .
3,657,033   4/1972  Sager .
5,219,128   6/1993  Mizuno .
5,246,521   9/1993  Shimura et al. .
5,368,664  11/1994  Sugiyama et al. .

FOREIGN PATENT DOCUMENTS 0440241  8/1991  European Pat. Off. .
63-42134  2/1988  Japan .
2092047  8/1982  United Kingdom .

Primary Examiner—David A. Simmons
Assistant Examiner—M. Curtis Mayes
Attorney, Agent, or Firm—Heslin & Rothenberg

[57] ABSTRACT

An ultrasonic apparatus and method for placing individual pillowed chips of light lock material in a cartridge are provided. A vacuum plate mounted on a pivotable arm picks up a chip and releases it into a cartridge. The cartridge has a recessed area into which the pillowed edge of the chip fits. Once positioned with the cartridge, utilizing a tuck plate, the chip is sealed in place using an ultrasonic horn.

19 Claims, 7 Drawing Sheets

ULTRASONIC APPARATUS AND METHOD FOR PLACING INDIVIDUAL CHIPS OF LIGHT LOCK MATERIAL

This application is a continuation of application Ser. No. 08/006,298, filed Jan. 19, 1993, now abandoned.

TECHNICAL FIELD

This invention relates to an ultrasonic apparatus for placing individual pillowed chips of light lock material in a film cartridge. More particularly, the invention provides a pivotable arm and vacuum plate which picks up an individual pillowed chip of light lock material and places the chip in a cartridge.. The chip has a pillowed edge which fits within a recessed area of the cartridge, and is further guided into the recessed area by a tuck plate. Once positioned within the cartridge, the chip is tacked to the cartridge using an ultrasonic horn.

BACKGROUND ART

Most film cartridges (also called film magazines) incorporate some kind of fabric or woven material in their assembly as a means of preventing light from entering the film exit in the cartridge. This guards against premature exposure of the outer convolutions of the film. A common fabric incorporated as a light lock material is referred to as "velvet". Velvet is a nylon yarn fiber which is bundled and woven into a rayon fabric backing material.

Assembly of velvet light lock material to conventional metal film cartridges is accomplished by applying heat to both lips of the cartridges which have been formed by a die set (but are still in a multiple strip stage yet to be died out). The velvet is pre-slit to size and applied in continuous web form to both sides of the multi cartridge strip in the proper locations. The velvet web is then clamped under pressure while the heat from the metal cartridge strip activates an adhesive coated on the back of the rayon fabric of the velvet, attaching the rayon backing of the light lock web to the cartridge strip. Once the adhesive has cured, the cartridge strip is indexed to the next step in the process. There the two velvet webs are cut between the individual notches denoting each cartridge by a hot knife process. This process is satisfactory as long as the outer shell of the cartridge is made of sheet steel.

However, a new polystyrene cartridge is being developed as a consumer product in the 35 millimeter film range. One of the main requirements of this new product is that the cartridge shell be made of plastic instead of sheet steel. This requires a whole multitude of design changes to achieve automated assembly of light lock material to film cartridges.

SUMMARY OF THE INVENTION

The film cartridge is now plastic (polystyrene) and therefore cannot be heated to activate an adhesive. An alternative attachment method is required. It is also highly desirable that this attachment method allow for separation of the light lock material from the cartridge to facilitate recycling. Furthermore, the nature of the cartridge design requires the light lock material to be handled as individual pieces, rather than in continuous web form.

These needs are met by the subject invention which provides an ultrasonic apparatus for placing individual pillowed chips of light lock material in a film cartridge. The apparatus includes a pivotable picking means which picks up an individual chip from a source and positions the chip over a cartridge. Also included is a placing means for placing the chip in the cartridge, and a tacking means for securing the chip to the cartridge.

The individual chips suitable for placement in a cartridge according to the subject invention are pillowed, preferably using an ultrasonic horn assembly having an ultrasonic horn and ultrasonic anvil. A composite web of light lock material is moved through the ultrasonic horn assembly, and the web positioned between the ultrasonic horn and ultrasonic anvil is pillowed or profiled by sealing a transverse seam across the web. The web is then repositioned and another seam is sealed.

The web with numerous transverse seams is also moved along to a notching means, which preferably uses a punch and die assembly. The notching means cuts out corner notches of two adjacent chips of light lock material centrally between the transverse seams. These notches provide clearance for features to prevent leakage of light at the corners of a film cartridge.

The web is then moved along to a cutting means, which again preferably uses a punch and die assembly. The cutting means cuts the web at the transverse seams to form a pillowed edge, and centrally between the transverse seams to form the non-pillowed, notched edge of the individual chip of light lock material.

Each individual chip of light lock material is then collected in a chip nest in the proper orientation for insertion into a film cartridge. This is accomplished by utilizing fingers to support the individual chip as it leaves the cutting means and to place the individual chip into a chip nest on a conveyor belt.

According to the subject invention, the individual chip is then picked from the nest by a pivotable picking means, which preferably comprises a vacuum plate mounted on a pivotable arm. The chip is positioned over a cartridge and when the vacuum to the vacuum plate is deactivated, the chip is released from the vacuum plate.

The chip is guided into a recessed area in the cartridge by a placing means, which includes the vacuum plate and also preferably comprises a tuck plate. The tuck plate, in one embodiment, comprises a member perpendicular to the base of the chip. The member guides the pillowed edge of the chip under a ledge and into the recessed area of the cartridge.

The apparatus of the subject invention further comprises a tacking means for securing the chip to the cartridge. Preferably, the tacking means comprises an ultrasonic horn which seals the chip to the cartridge. The horn pierces the chip so as not to disrupt the surface of the light lock material, which would have detrimental effects on the light lock function of the chip.

A method and apparatus for placing individual pillowed chips of light lock material in plastic film cartridges is thus provided.

BRIEF DESCRIPTION OF THE DRAWINGS

These and other objects, advantages and features of the present invention will be more fully understood from the following detailed description of certain embodiments thereof when considered in conjunction with the accompanying drawings in which.

DESCRIPTION OF THE PREFERRED EMBODIMENTS

As indicated above, the subject invention is broadly directed to an ultrasonic apparatus for placing individual chips of light lock material in a film cartridge.

The invention utilizes a miniature ultrasonic horn combined with a pick and place applicator device having a vacuum assist custom pick plate, with a special lead-in head designed to direct the chip into the matching ledge in the cartridge. This captures the profiled edge of the chip and secures it while an ultrasonic spot weld takes place. The miniature ultrasonic vibration equipment incorporating the ultrasonic horn, designed in a small flat pin head configuration, applies high frequency vibration. This heats and compresses the polystyrene substrate of the chip and spot welds it in place to the light lock area of the cartridge half.

To more fully understand the subject invention, the formation of the individual pillowed chips of light lock material is first described. Pillowing involves the forming of a valley across the width of a fabric web which creates a curvature (pillow affect) to the adjacent areas perpendicular to the compressed flat cross section in the valley of the fabric web. After notching and cutting, the individual chips of light lock material can be placed in a film cartridge according to the subject invention.

Figure 1:
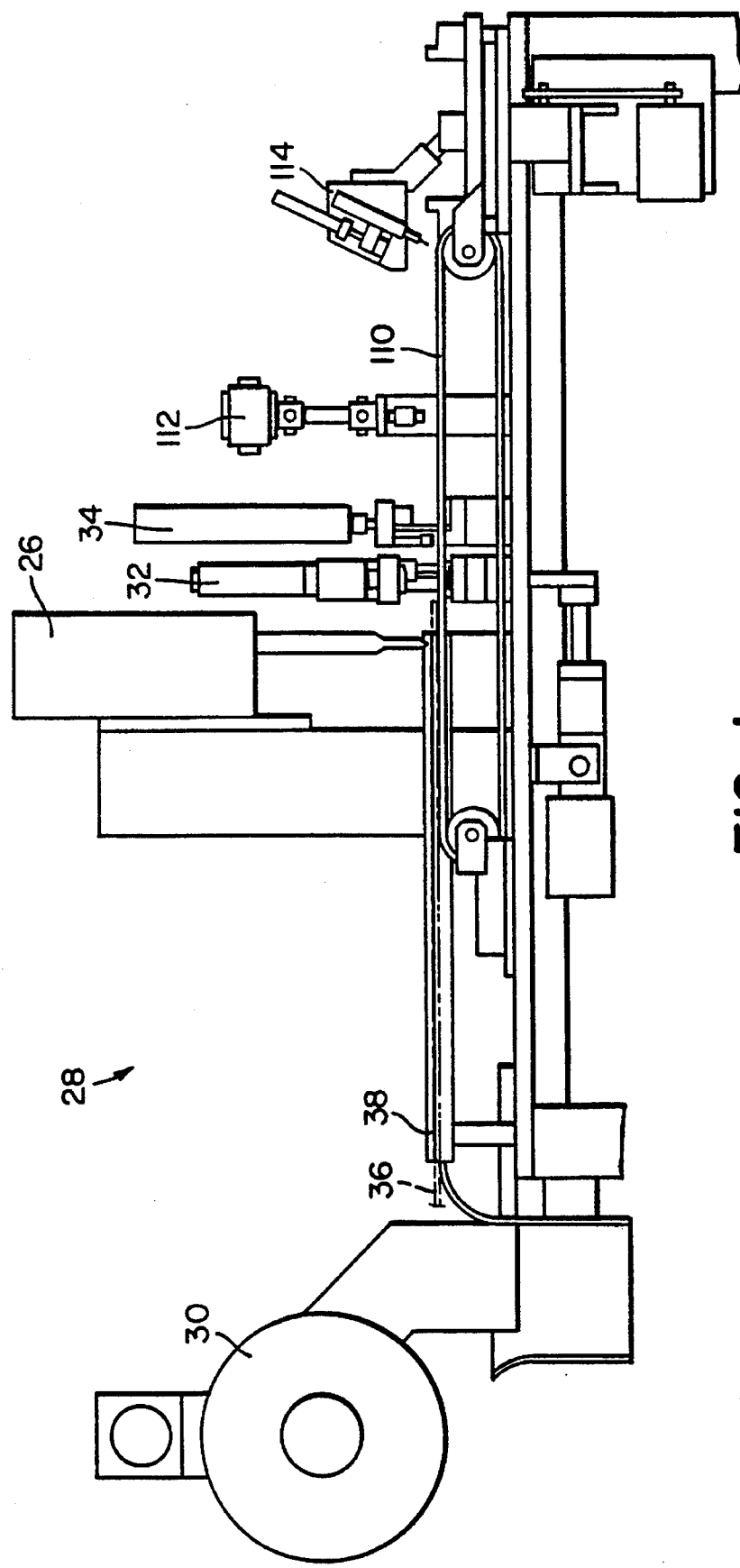
FIG. 1 is a cut-away side view of an ultrasonic apparatus for forming individual pillowed chips of light lock material, and for placing the individual chips into a cartridge according to one embodiment of the subject invention.
Figures 4, 5:
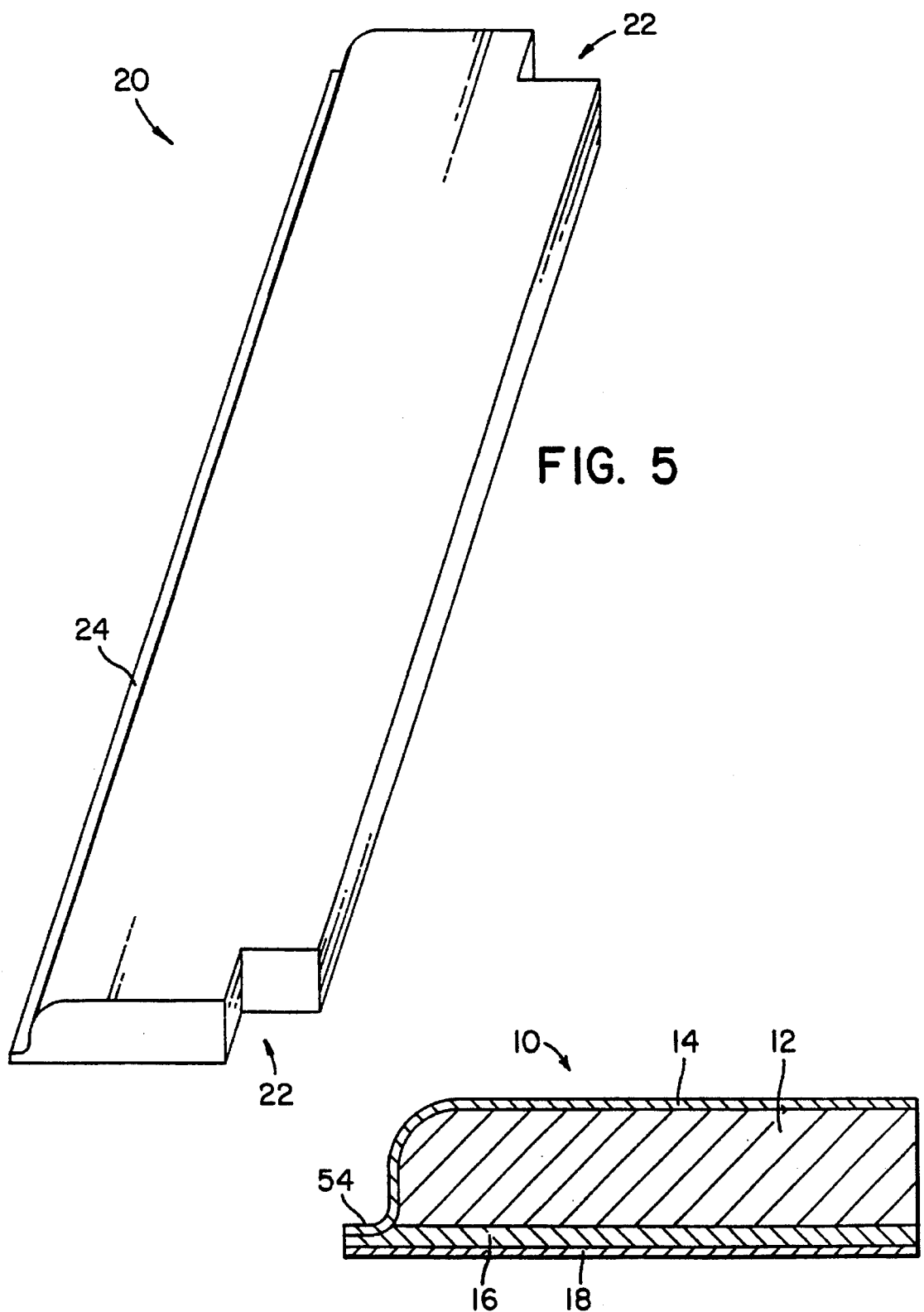
FIG. 4 is a cross-sectional side view of an individual pillowed chip of light lock material.
FIG. 5 is an isometric view of the individual pillowed chip of light lock material shown in FIG. 4.

FIG. 1 shows an entire machine 28 with the product flow proceeding from left to right. The raw foam light lock material web 36 in stockroll form is mounted to the unwind station 30. Referring to FIG. 4, the fabric web 10 is made of a thin top layer of a brushed pile surface material, such as polyester fabric 14, which is flame bonded to a second layer of foam, such as open cell polyurethane foam 12. Under the foam is a rayon yarn 16 backing material. The web construction also includes a polystyrene substrate 18 which is bonded to the bottom of the web under the rayon yarn 16.

The web has been slit to the width of the cartridge opening, and the polystyrene backing material has been laminated to it. The stockroll is first unwound. A weighted looper is used to maintain approximately 1.5 lb. tension on the 1.500 inch wide web. This tension is necessary to desensitize the subsequent processes to incoming foam thickness variations. The leading end of the web material 36 is threaded down the length of the web guide channel 38 until it comes in contact with the notch shuttle 32. Start up requires that the web 36 be advanced into the notch shuttle 32 and cycled sixteen pitches until the first profile reaches the shuttle station. The computer program which controls all machine functions will reject all unprofiled chips automatically. The main drive for advancing the web 36 is designed into the notch shuttle 32 which grips the web and moves one cycle distance (the length of a chip) at a time in feeding the cut-off assembly 34. The unwind 30 is motorized and step feeds the web 36 to the apparatus as needed while keeping tension on the web 36 which is also required. With the machine now loaded with raw web material, automatic cycling may begin.

Figure 2:
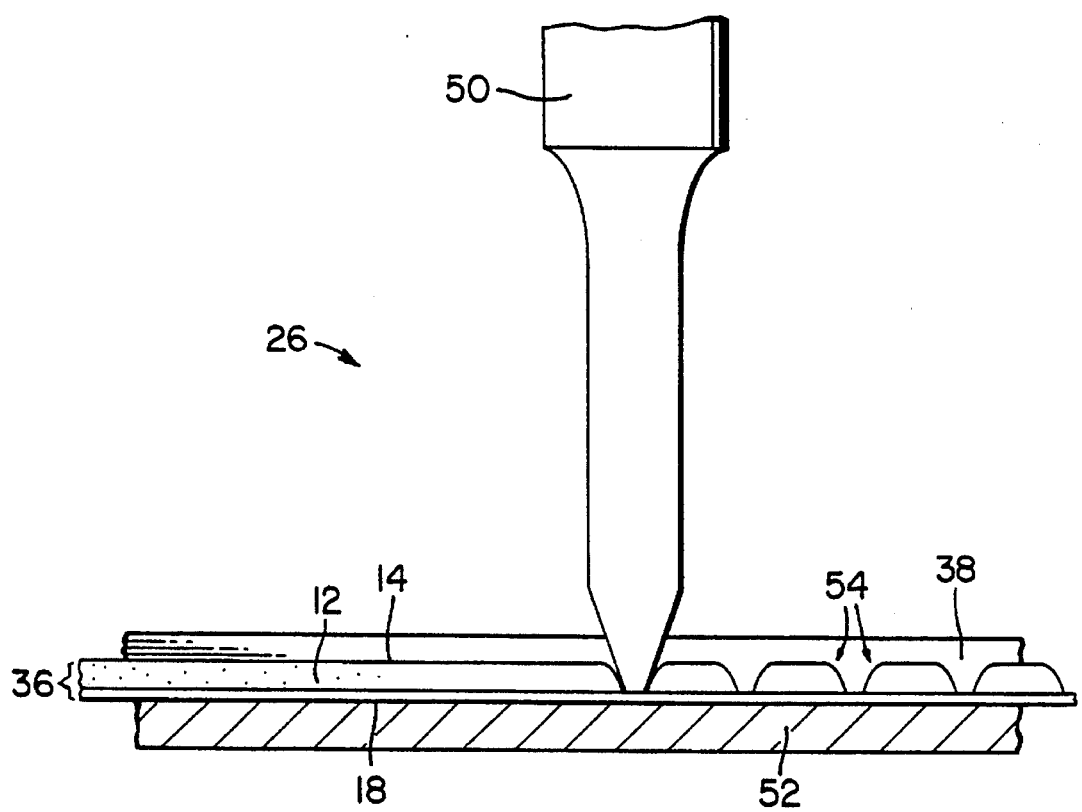
FIG. 2 is a cut-away side view of a pillowing apparatus.

Referring to FIG. 2, one complete automatic cycle starts with the ultrasonic profile station 26 by activation of its air cylinder which lowers a 20 Kilohertz ultrasonic horn assembly 50 until it comes in contact with a fixed bottom stop. This compresses the web 36 to an 0.008 thousandths of an inch thick dimension between the working surface of the ultrasonic horn 50 (a dull blade configuration) and the ultrasonic anvil 52 which forms the base of the web guide channel 38. After a 500 millisecond delay in this position the ultrasonic horn is activated by an ultrasonic generator for 200 milliseconds, welding or sealing a flat area across the web width and creating a curvature in the width of the web on both sides of the welded area. This weld is caused by the heat produced by the high frequency vibration of the ultrasonic horn, which melts the cross section of the web to the polystyrene substrate.

Figure 3:
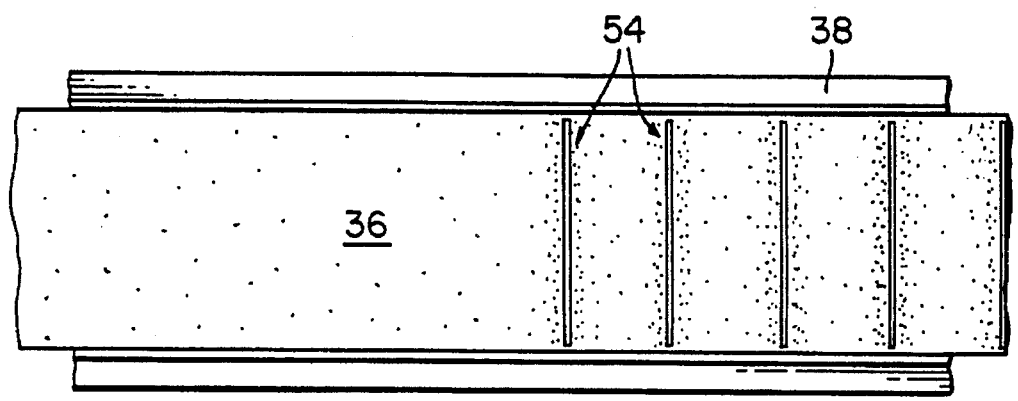
FIG. 3 is a top view of a pillowed web of light lock material.

At the end of 200 milliseconds weld time, the generator is de-energized. The ultrasonic horn is held in place against the welded portion of the web for an additional 300 milliseconds while the welded area solidifies. At the end of this duration, the cylinder is retracted, removing the ultrasonic horn from contact with the web. The result is a profile or pillow 54 in the web 36 of light lock material, as also shown in FIG. 3. The profile is required to facilitate thrusting of film from the cartridge without binding. The profile is only required on the leading edge, therefore the ultrasonic horn is only activated every other machine cycle.

With the profile complete, the notch shuttle 32 has clamps which grip the web at each side and advance it. The clamps grip the web at the center between two profiled edges. The notching die is then activated and punches out a section on each edge of the web on this center line as shown in FIG. 5, in an orientation which creates the notches 22 in two chips 20 simultaneously. The notches are generated midway between the profiled edges 24 by a zero clearance punch and die. This notching die 32 is mounted to a set of precision slides and is shuttled forward by a linear motor.

To achieve the notch feature every other cycle, the clamps are designed with notching punches attached. When the clamps grip the web, the punches simultaneously cut the notch on both sides and then the shuttle moves the web two pitches before releasing the web and returning to home position at the next non-profiled edge location. Thus, the shuttle returns two pitches, the notches are cut out, the shuttle goes forward one pitch, the ultrasonic horn forms a pillow, the shuttle goes forward one pitch, the web is released, and the shuttle again returns two pitches.

Thus, the notch shuttle mechanism 32 moves the web forward one chip length and the ultrasonic profile process 26 is activated again, and so this alternating action continues in this order: web advance; weld a profile while the notching die stays inactive; web advance; and activate notching die to punch out notches while the ultrasonic profile station stays inactive.

The profiled and notched light lock material then advances to the cut-off die 34 where the material is cut into individual chips by a zero clearance punch and die. The cut-off die 34 operates every cycle, alternating between cutting profiled edges of two consecutive chips and then cutting between non-profiled edges of two consecutive chips with the notch feature already completed. The result when this web has gone through the cut-off die 34 located to the right of the notching die 32 in the machine 28 is a chip with one width edge ultrasonically welded forming a 0.020 thousandths of an inch flat edge and a curved profile of the surface material, while the opposite width edge is chipped straight off with a small rectangular notch at each corner (see FIG. 5).

Figure 6:
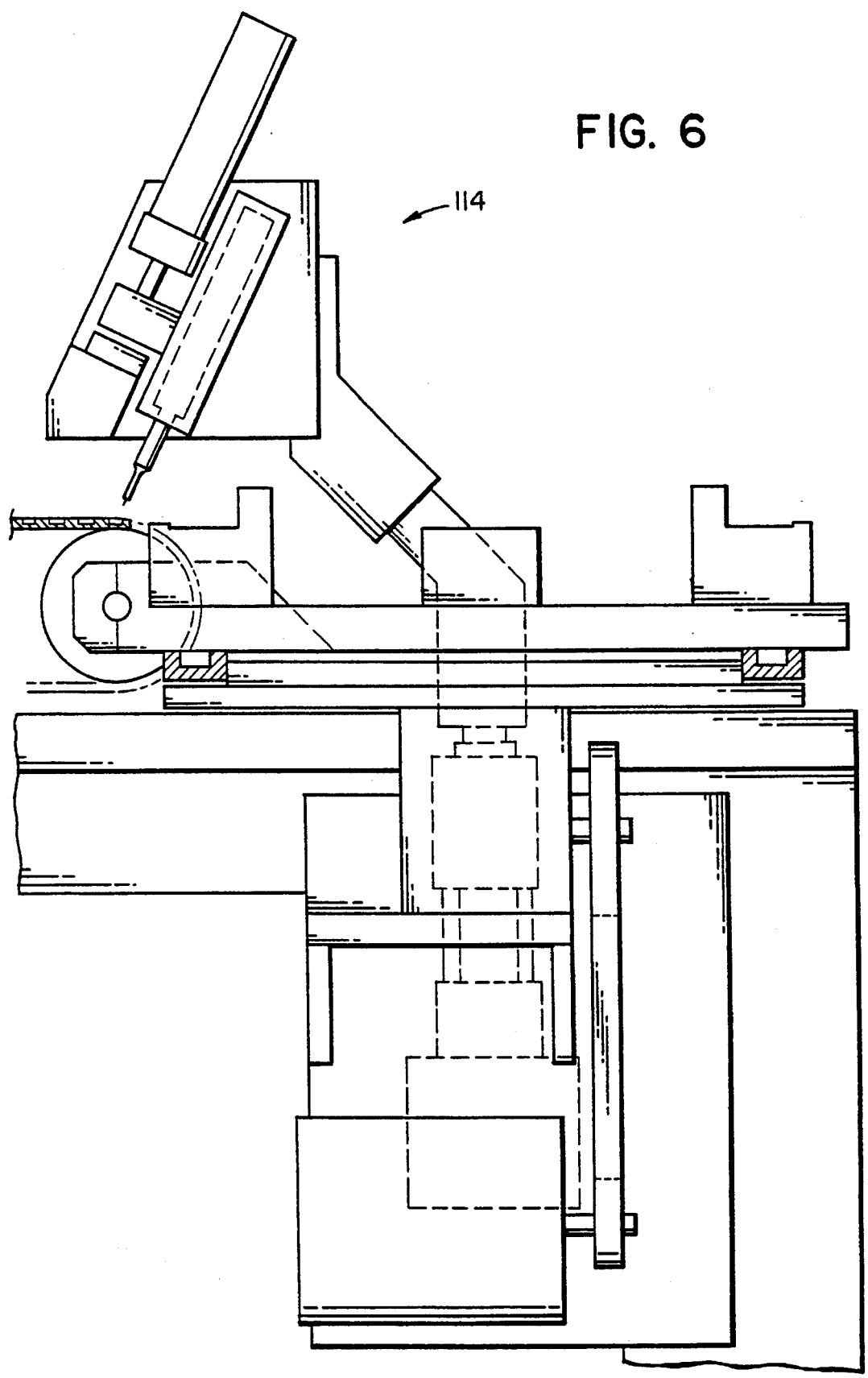
FIG. 6 is a cut-away side view of a tuck and tack applicator mechanism according to one embodiment of the subject invention.

A set of back-up fingers that are driven by an air cylinder support the chips when they are cut at the cut-off die 34, and helps place them oriented in a nest that is located below the die set. The nests are attached to a metal belt, which indexes them out from underneath the die set, and delivers them to the remainder of the apparatus shown in FIG. 1. The subject invention is directed to this remainder portion of the apparatus (see closeup in FIG. 6). The invention operates as follows.

The chips land in an individual nest attached and evenly spaced on the chip transfer conveyor belt 110. The chips travel one pitch at a time to the chip turn-around station 112 where every other chip having its profiled edge facing the applicator is picked up from its nest using a vacuum rotational mechanism, swiveled 180 degrees and is returned to the same nest. Now the profiled edges of each chip are in the same orientation and the chips are ready for installation and proceed down the conveyor belt to the chip applicator station 114 (see FIG. 6).

Figure 7:
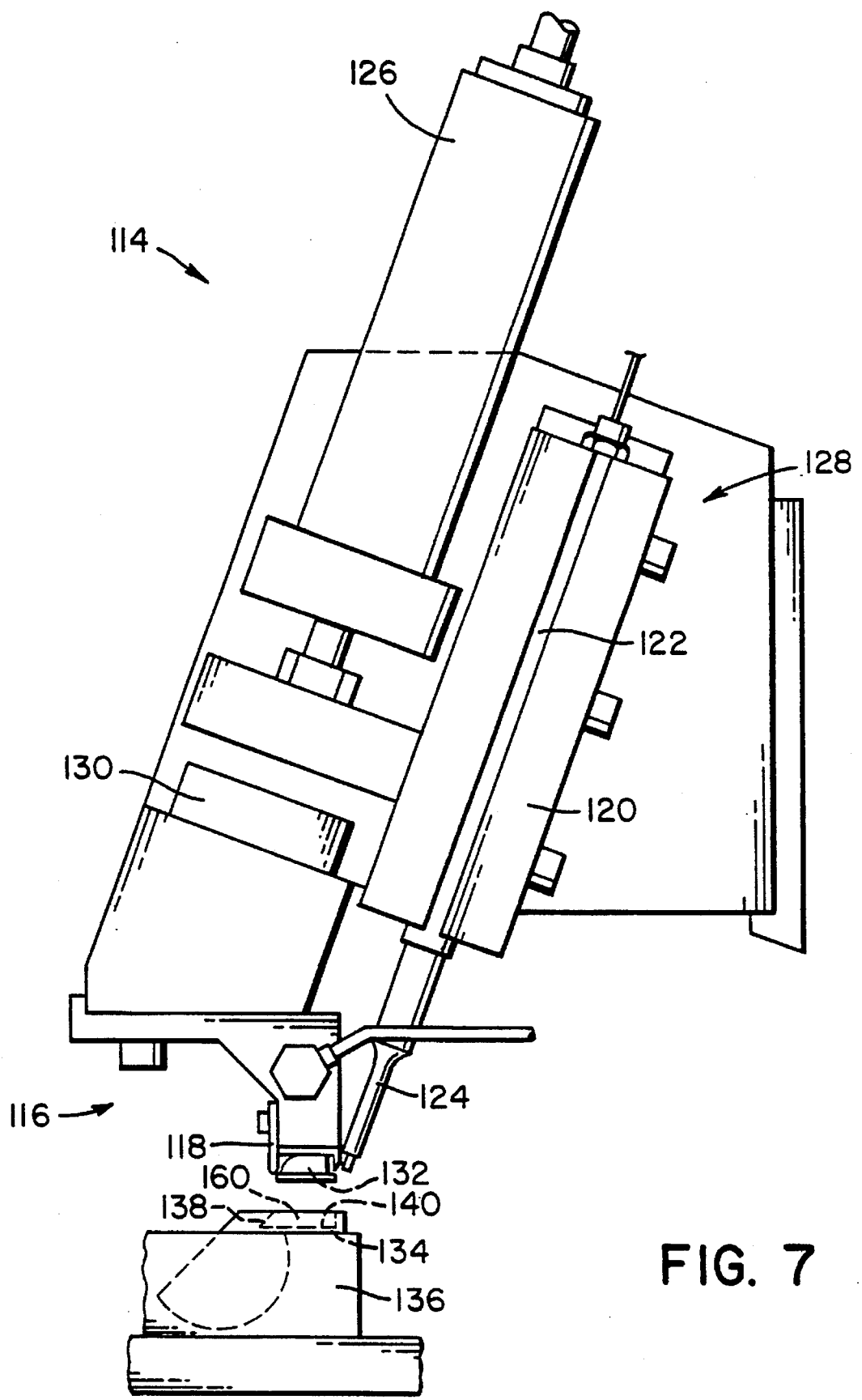
FIG. 7 is a close-up cut-away side view of the tuck and tack applicator mechanism shown in FIG. 6.
Figure 9:
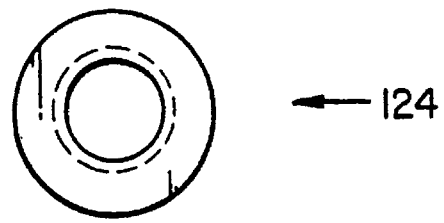
FIG. 9 is a top view of the ultrasonic horn shown in FIG. 8.
Figure 8:
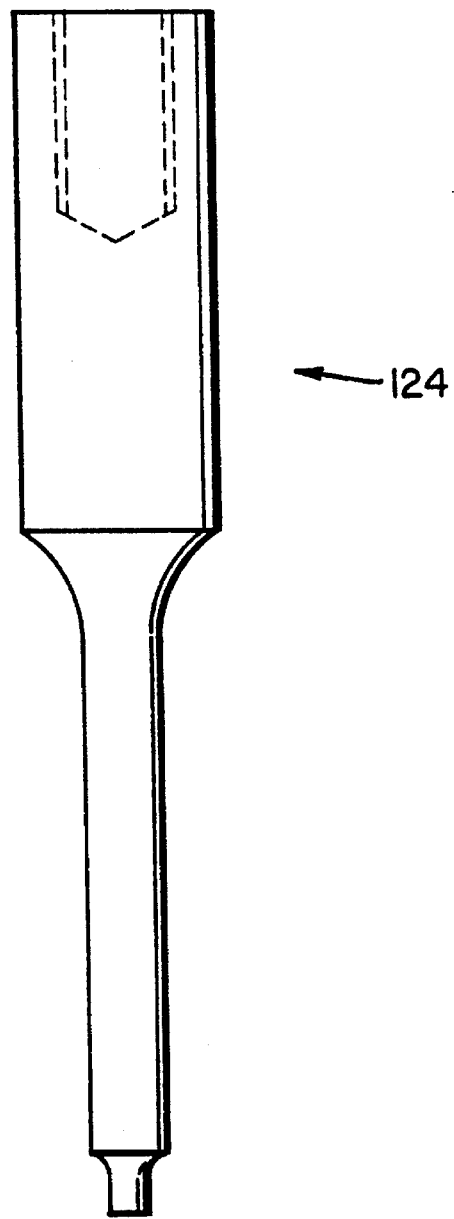
FIG. 8 is a cut-away side view of the ultrasonic horn shown in FIG. 7.
Figure 10:
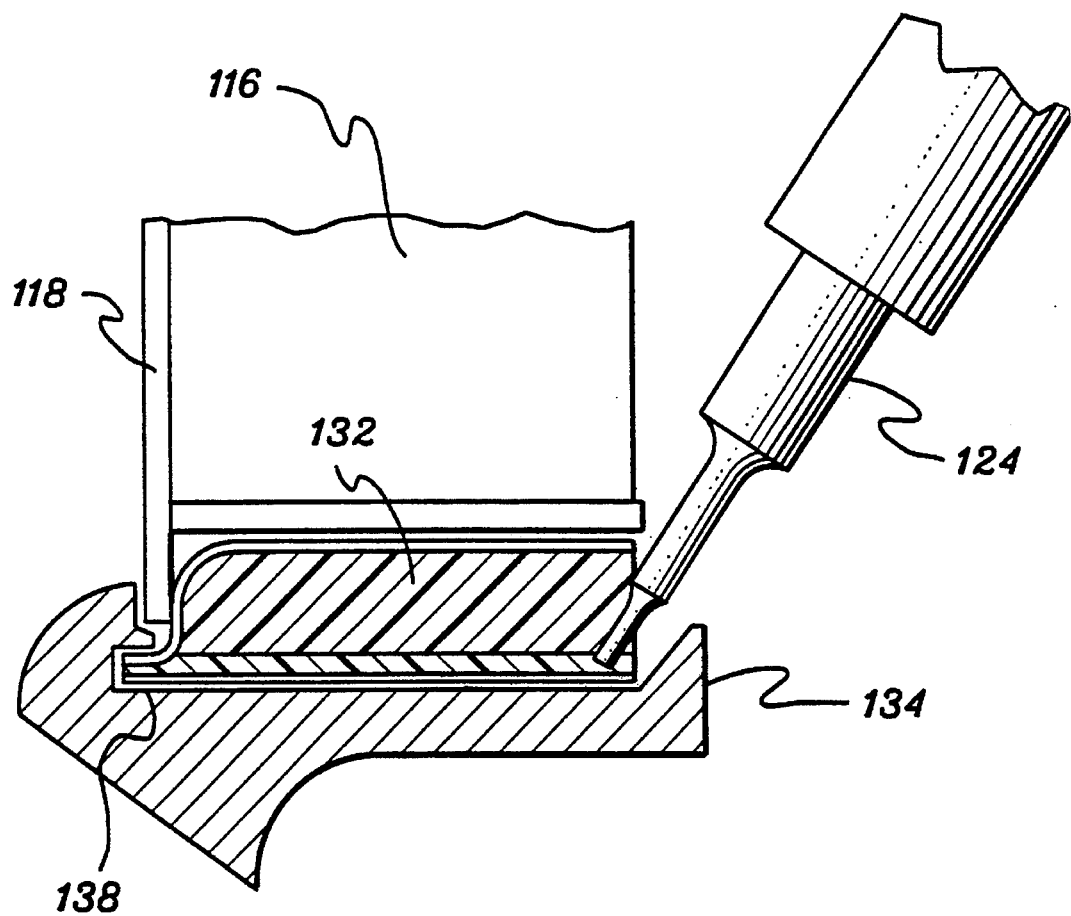
FIG. 10 is a cut-away side view of a tuck and tack applicator mechanism according to one embodiment of the present invention.

When the light lock chip arrives at the end of the conveyor belt the chip applicator station 114 is at its home position over the last horizontal conveyor belt nest. The chip applicator mechanism is maneuvered by a multi motion linear rotatory actuator mounted under the machine table which allows it to be raised, lowered, and also turned 90 degrees. The applicator station shown in FIG. 7 houses the vacuum pick and place head 116 with its tuck plate 118, the ultrasonic transducer carriage 120 containing the miniature 70 Kilohertz transducer 122, connected to the special ultrasonic horn tip 124 (see also FIGS. 8, 9 and 10). Also shown is the ultrasonic probe actuating cylinder 126, the transducer probe slide mechanism 128, and the actuator bottom stop 130. To remove a chip from the conveyor belt and place it in a cartridge half the following steps are performed.

The applicator station 114 is lowered by its multi motion actuator until the vacuum plate of the pick and place head 116 contacts a foam light lock chip 132 covering its top surface. Vacuum is now applied through numerous holes in the plate contacting the chip which keeps the chip captured to the applicator. The applicator station 114 is then raised to the home position and turned 90 degrees where it stops directly over a cartridge half 134 which is being held in place by vacuum in its supporting fixture nest 136.

The applicator 114 is now lowered placing the foam light lock chip 132 into the cartridge half light lock area. At this point the camming action takes place due to the down force of the applicator combined with the profiled edge of the chip and the lead-in groove under-cut ledge 138 in the cartridge, meaning that the force directs the profiled edge to slide into and underneath the under-cut grooved ledge and into the recessed area 160 in the cartridge half.

Now that the chip has been placed and remains captured by the vacuum head 116 and the downward force of the applicator mechanism, the pneumatic cylinder 126 lowers the miniature ultrasonic probe carriage 120 down the carriage slide 128. This motion allows the (0.035 inch) thirty-five thousandths of an inch diameter miniature ultrasonic horn tip to pass through the center relief of the vacuum head 116, avoid the chip surface layer, due to the carriage 120 off perpendicular angle, and contact the outside edge of the middle layer of foam. The downward force continues compressing the foam until the horn tip stops by meeting the resistance of the thin layer of the chip's polystyrene substrate which is pressed against the bottom plane of the light lock area in the cartridge half 134 by the vacuum head 116.

Within milliseconds of reaching this position the miniature ultrasonic horn 124 is energized through the ultrasonic transducer 122 power by a 70 Kilohertz ultrasonic generator. This causes the ultrasonic horn 124 to vibrate longitudinally at the frequency which heats and melts the substrate in this small area 140 under the horn tip, spot welding the substrate to the cartridge half 134. The miniature horn tip must engage the non profiled chip edge in the center without contacting the surface material, pierce the foam, and under pressure weld the polystyrene substrate to the cartridge without bending or buckling the chip in any way. Near the end of the weld, which only requires about 200 milliseconds, the carriage 122 contacts the carriage bottom stop 130 preventing the horn tip from penetrating any further than (0.005 inch) five thousandths of an inch into the cartridge surface.

With the ultrasonic tack weld complete the vacuum from the pick and place head 116 is de-energized, the pneumatic cylinder 126 retracts the ultrasonic horn probe carriage 122 to its up most position, and the pick and place applicator mechanism is raised and returned 90 degrees back to its home position over the nest for installation. The nest fixture which holds four cartridge halves is rotated clockwise to locate another cartridge half ready for assembly. Now a single cycle of the machine has been completed and with a signal from the main control computer the next cycle begins.

Several aspects of a chip's construction render such a chip suitable for placement according to the method of the subject invention. The attachment of the polystyrene substrate to the chip accomplishes two requirements needed for a successful profiling and assembly process. First, the rigidity of the substrate forces the surface material to form a one sided profile which creates the lead in edge. Secondly, this one sided profile is imperative to the tucking process of the subject invention. The flat profiled edge must fit under a small under cut groove in the cartridge shell halves during assembly.

With a suitable chip thus selected, the subject invention provides a placement device which acts as a small pick and place applicator. The device maneuvers the "chip" in place by way of a custom designed vacuum pick up plate that deposits the preformed and cut to size foam light lock chip into a recessed area in the thermoplastic cartridge half. The cartridge is held in place by a vacuum assisted fixture during this process. The miniature 70 kilohertz ultrasonic probe is mounted to the under side of the applicator, centered and at an off perpendicular angle. Its function is to secure the foam chip to the cartridge half with a small tack weld on the outside edge of the chip.

The selection of a profiled chip allows the inside edge of the chip to slide under a ledge into a recessed area of the cartridge where it becomes trapped. While the chip is held in place, tucked under the ledge, the miniature ultrasonic probe having a small pin like horn tip is actuated downward at an angle of 25 degrees from vertical such that the horn tip misses the outside edge of the surface material of the chip, penetrates the foam material, and ultrasonically spot welds the polystyrene substrate in the center of the outside edge of the light lock area in the cartridge half. This angle is very important to the assembly by presenting the horn tip to the chip in such a way that it does not contact the chip's surface material, thereby preventing damage such as button tucking or piercing of the outer surface resulting in reduced light lock capability. The combination of the recessed area and the single 0.035 inch diameter ultrasonic seal is sufficient to secure the light lock chip. It also provides the ability to easily remove the light lock chip for recycling.

The use of a chamfered edge in the cartridge, in conjunction with a mating edge on the application head, helps to cam the light lock chip underneath the recessed ledge in the cartridge. The use of the "tuck plate" holds the profiled edge of the light lock chip flat so that it can be slid underneath the recessed ledge in the cartridge. The angled sealing of the light lock chip with the 70 kHz ultrasonic horn allows the horn to penetrate the foam and seal the polystyrene backing material without marring the knit fabric surface of the light lock material. The use of the recess in the cartridge, in combination with a single ultrasonic tack, secures the light lock chip in the cartridge. The tack is done at an angle, so that only the polystyrene substrate is sealed. This prevents "button tucking" of the fabric cover layer.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as defined by the following claims.

What is claimed:

1. A method for installing a light lock chip in a thermoplastic film cartridge, said chip being of the type having a lead-in edge and a smooth top surface upon which film is to slide and a thermoplastic substrate and said cartridge being of the type having a film dispensing lip and an undercut recess for receiving a lead-in edge of a chip, said method comprising the steps of:

inserting the lead-in edge of a chip into the undercut recess of a cartridge;

holding the chip with its lead-in edge in the undercut recess and its substrate against the lip of the cartridge;

while the chip is so held, securing the substrate to said cartridge proximate the lip at least one point without deforming the smooth top surface of the chip; and terminating the holding step.

2. The method of claim 1 wherein the securing step is accomplished by welding the substrate to the lip.

3. The method of claim 2 wherein the welding step is accomplished by advancing a pin-shaped welding device into contact with the substrate without passing through the top surface of the chip.

4. The method of claim 3 wherein the welding device is advanced to the substrate at an angle thereto so as to avoid piercing the smooth surface of the chip.

5. The method of claim 4 wherein the welding device is an ultrasonic horn.

6. In a system for placing and securing a light lock chip in and to a thermoplastic cartridge, said chip being of the type having a smooth top surface upon which film is to slide and a thermoplastic substrate bottom surface, an applicator comprising:

means for picking a chip from a chip source and for placing and holding the chip in a cartridge with its substrate against the cartridge; and means mounted on said picking, placing and holding means for welding the substrate of said chip to said cartridge without deforming the smooth top surface of said chip.

7. The applicator of claim 6 wherein said welding means comprises an ultrasonic horn.

8. The applicator of claim 7 wherein said horn is pin-shaped and mounted at an angle with respect to said chip holding means so as to penetrate said chip and contact said substrate without piercing said smooth top surface of said thermoplastic light lock chip.

9. The applicator of claim 8 wherein said welding means includes means for advancing said ultrasonic horn toward said chip for making contact therewith and for retracting said horn away from said chip.

10. An apparatus for inserting light lock chips into a thermoplastic cartridge, said chips being of the type having a smooth top surface upon which film is to slide and a thermoplastic substrate bottom surface, said apparatus comprising:

a machine frame;

a source of chips located on said frame;

cartridge holding means mounted to said frame;

means for picking an individual chip from said source of chips and placing said individual chip in a cartridge held by said cartridge holding means; and means for welding said substrate to a cartridge without deforming said smooth top surface.

11. The apparatus of claim 10 wherein said welding means comprises an ultrasonic horn.

12. The apparatus of claim 11 wherein said horn is pin-shaped and mounted at an angle with respect to the cartridge holding means so as to penetrate said chip and contact said substrate without deforming said smooth top surface.

13. The apparatus of claim 12 wherein said welding means includes means for advancing said ultrasonic horn toward said substrate for making contact therewith and for retracting said horn away from said substrate.

14. An ultrasonic system for placing an individual chip of light lock material in a cartridge, said ultrasonic system comprising:

a machine frame;

a source of individual chips of light lock material located on said frame, each of said individual chips of light lock material being pillowed on one edge thereof and each individual chip comprising:

a foam cell having a top surface and a bottom surface;

a layer of surface material connected to said top surface of said foam cell;

a layer of rayon yarn connected to said bottom surface of said foam cell; and a rigid substrate connected to said rayon yarn;

cartridge holding means mounted to said frame;

a cartridge held by said cartridge holding means, said cartridge having a ledge on one edge thereof forming a recessed area within said cartridge;

pivotable picking means mounted to said frame for picking an individual chip of light lock material from said source and pivoting to position said individual chip of light lock material over said cartridge;

placing means mounted to said pivotable picking means for placing said individual chip of light lock material in said cartridge, said placing means including a tuck plate, wherein said tuck plate guides said individual chip of light lock material into said cartridge such that said pillowed edge of said individual chip of light lock material fits under said ledge and into said recessed area; and a retractable ultrasonic horn mounted to said pivotable picking means and positioned at an angle to said individual chip of light lock material, for tacking said individual chip of light lock material to said cartridge, wherein when said ultrasonic horn is extended, said ultrasonic horn pierces said foam cell and said rayon yarn without piercing said surface material and wherein vibration of said extended ultrasonic horn thereby seals said rigid substrate to said cartridge.

15. The ultrasonic system of claim 14 wherein said pivotable picking means comprises a pivotable arm and a vacuum plate mounted to said arm, wherein when said vacuum plate is activated and is in contact with said individual chip of light lock material, said individual chip of light lock material is held against said vacuum plate.

16. The ultrasonic system of claim 15 wherein said placing means comprises said vacuum plate, wherein when said vacuum plate is deactivated said individual chip of light lock material disconnects from said vacuum plate.

17. The ultrasonic system of claim 14 wherein said tuck plate comprises a member positioned perpendicular to a base portion of said individual chip of light lock material.

18. The ultrasonic system of claim 14 wherein said cartridge comprises plastic.

19. The apparatus according to claim 14, wherein the surface material connected to said top surface of said foam cell comprises brushed pile material.

* * * * *